(12) United States Patent
Hasegawa et al.

(10) Patent No.: US 10,558,034 B2
(45) Date of Patent: Feb. 11, 2020

(54) OPTICAL SCANNING DEVICE AND IMAGE FORMING APPARATUS

(71) Applicant: Konica Minolta, Inc., Tokyo (JP)

(72) Inventors: Ryo Hasegawa, Hachioji (JP); Hajime Taniguchi, Toyokawa (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 16/439,156

(22) Filed: Jun. 12, 2019

(65) Prior Publication Data
US 2020/0012207 A1    Jan. 9, 2020

(30) Foreign Application Priority Data
Jul. 4, 2018   (JP) .................................. 2018-127610

(51) Int. Cl.
| | | |
|---|---|---|
| G02B 26/00 | (2006.01) |
| G06K 15/00 | (2006.01) |
| G03G 15/04 | (2006.01) |
| B41J 2/00 | (2006.01) |
| G02B 26/12 | (2006.01) |
| G06K 15/12 | (2006.01) |
| B41J 2/47 | (2006.01) |

(52) U.S. Cl.
CPC ............ *G02B 26/123* (2013.01); *B41J 2/473* (2013.01); *G02B 26/12* (2013.01); *G03G 15/04072* (2013.01); *G06K 15/1228* (2013.01)

(58) Field of Classification Search
CPC ..... G03G 15/04072; G03G 2215/0404; G06K 15/1228; G06K 15/1238; G02B 7/1821; G02B 26/123; G02B 26/125; B41J 2/473

USPC .............................. 399/4; 347/241, 243, 245
See application file for complete search history.

(56) References Cited

U.S. PATENT DOCUMENTS

| 8,780,158 B2 * | 7/2014 | Hudson | G02B 26/121 |
| | | | 347/134 |
| 8,908,001 B2 * | 12/2014 | Amada | G03G 15/326 |
| | | | 347/242 |
| 2007/0070173 A1 * | 3/2007 | Yamakawa | B41J 2/471 |
| | | | 347/241 |

(Continued)

FOREIGN PATENT DOCUMENTS

| JP | 2002148542 A | * 5/2002 |
| JP | 2011197356 A | * 10/2011 |
| JP | 2012108383 A | 6/2012 |

*Primary Examiner* — Robert B Beatty
(74) *Attorney, Agent, or Firm* — Lucas & Mercanti, LLP (57) ABSTRACT

In an optical scanning device, a housing has a structure divided into an upper stage and a lower stage by a mounting plate on which a deflector, a first optical system and a second optical system are mounted. A first optical system reflection mirror and a second optical system reflection mirror are mounted in the other of the upper stage and the lower stage in which the deflector is not mounted. Each of the first optical system and the second optical system is disposed across a region including the upper stage and the lower stage. The first optical system reflection mirror and the second optical system reflection mirror are disposed with the deflector located therebetween. The first optical system reflection mirror is disposed on a side of the second optical system, and the second optical system reflection mirror is disposed on a side of the first optical system.

12 Claims, 11 Drawing Sheets

(56) References Cited

U.S. PATENT DOCUMENTS

| | | | | |
|---|---|---|---|---|
| 2011/0013248 A1* | 1/2011 | Otoguro | ............... | G02B 26/125 |
| | | | | 359/207.11 |
| 2011/0129259 A1* | 6/2011 | Nakano | .............. | H04N 1/00519 |
| | | | | 399/221 |
| 2011/0298882 A1* | 12/2011 | Otana | ...................... | B41J 2/473 |
| | | | | 347/118 |
| 2019/0061372 A1* | 2/2019 | Nakano | ................... | B41J 2/473 |

* cited by examiner

OPTICAL SCANNING DEVICE AND IMAGE FORMING APPARATUS

The entire disclosure of Japanese Patent Application No. 2018-127610 filed on Jul. 4, 2018 is incorporated herein by reference in its entirety.

BACKGROUND

Technological Field

The present disclosure relates to an optical scanning device and an image forming apparatus.

Description of the Related Art

There is a known optical scanning device using a so-called bilateral deflection system, including the first optical system and the second optical system with a deflector located therebetween, in which a luminous flux emitted toward the first optical system and a luminous flux emitted toward the second optical system are deflected on different reflection surfaces of the deflector for scanning. In contrast, there is a known optical scanning device using a so-called unilateral deflection system, including an optical system disposed only on one side of a deflector, in which a luminous flux is deflected on a single reflection surface of the deflector for scanning.

In the optical scanning device using a bilateral deflection system, luminous fluxes from a plurality of optical systems are deflected by a common deflector for scanning. Accordingly, the number of deflectors mounted in an image forming apparatus can be reduced. Furthermore, optical systems can be efficiently arranged around the deflector defined as the center, thereby allowing space saving in the apparatus. Therefore, a bilateral deflection system is employed generally when aiming at cost and size reduction.

An optical scanning device is generally provided with an optical detection sensor for detecting the scanning start position on the surface-to-be-scanned. In the optical scanning device using a bilateral deflection system, a luminous flux is deflected for scanning using a common deflector through the optical systems that face each other. Thus, the scanning directions on the surfaces-to-be-scanned for the first optical system and the second optical system are opposite to each other.

When the scanning directions are opposite to each other, the posture of an optical element is changed due to installation errors, distortions in an apparatus caused by attachment to a body, and the like. Thus, when the position of the luminous flux incident on the optical detection sensor is changed to thereby displace the scanning start position, the scanning line of the first optical system and the scanning line of the second optical system are moved in directions opposite to each other. Such movements of the scanning lines in the opposite directions cause a displacement in superimposition of latent images by the first optical system and the second optical system, thereby consequently leading to a color deviation on an image, which is known as a common problem.

As a technique for addressing the above-described problem, there is a known technique for detecting the scanning start position of a luminous flux on the surface-to-be-scanned for each optical system by guiding the luminous flux to an optical detection sensor provided on the outside of a region-to-be-scanned of each optical system by using a reflection mirror provided also on the outside of the region-to-be-scanned of each optical system.

Furthermore, Japanese Laid-Open Patent Publication No. 2012-108383 discloses a technique for achieving downsizing of an apparatus by setting an optical path length to an optical detection sensor to be shorter than an optical path length to a surface-to-be-scanned by causing a luminous flux immediately after deflection to be reflected on a reflection mirror and collected onto the optical detection sensor using a light collecting lens.

SUMMARY

However, according to the technique disclosed in Japanese Laid-Open Patent Publication No. 2012-108383, a reflection mirror and a light collecting lens are placed in the vicinity of a deflector. Since the deflector generally obtains rotating force from a motor, it generates heat. Accordingly, this heat changes the posture of the reflection mirror placed in the vicinity of the deflector. Furthermore, this heat also changes the posture of the light collecting lens placed in the vicinity of the deflector, and additionally, causes thermal expansion of the lens, thereby changing its optical performance.

When heat changes the posture and the performance of the reflection mirror and the light collecting lens, the position of the luminous flux incident upon the optical detection sensor is deviated. When the position of the luminous flux incident upon the optical detection sensor is deviated, it becomes difficult to correctly detect the scanning start position of the luminous flux on the surface-to-be-scanned, so that a color deviation occurs in the image, which may lead to image deterioration.

Particularly when a luminous flux is caused to be incident upon an optical detection sensor through a light collecting lens, the incident position of light is deviated largely due to heat (posture change of the lens and thermal expansion of the lens). Thus, it is desirable to cause a luminous flux to be incident upon the optical detection sensor without using a light collecting lens. However, when a light collecting lens is not used, the optical path to the optical detection sensor is increased in length. When the optical path length is increased, the apparatus may be increased in size. Also, light collecting lenses are generally high-cost components. Thus, when such a light collecting lens is used for each optical system, the apparatus may be increased in cost.

For achieving downsizing of the apparatus without using a light collecting lens, there is generally a method of providing an optical path folded several times by increasing the number of reflection mirrors. However, the increased number of reflection mirrors may lead to a non-negligible degree of positional displacement of the luminous flux incident upon the optical detection sensor that is caused by the posture change of the reflection mirror resulting from heat of the deflector, which may lead to image deterioration.

Furthermore, when the number of reflection mirrors is increased, the design flexibility is decreased due to the restrictions on arrangement of other optical elements. Thus, the apparatus may be further increased in cost.

Posture change and thermal expansion caused by heat of a deflector occur also in an optical element used in an optical system for scanning of a surface-to-be-scanned. Thus, it is desirable that the reflection mirror for guiding a luminous flux to an optical detection sensor is placed not immediately behind the deflector but placed relative to the luminous flux that has passed through a last lens in each scanning optical system.

The present disclosure has been made in order to solve the above-described problems, and aims to provide an optical scanning device and an image forming apparatus that can be reduced in size at low cost while suppressing image deterioration (color deviation) caused by positional displacement of a luminous flux incident upon an optical detection sensor.

To achieve at least one of the above-mentioned objects, according to an aspect of the present disclosure, an optical scanning device reflecting one aspect of the present disclosure comprises: a deflector configured to deflect a luminous flux from a light source; a first optical system for scanning of a first surface-to-be-scanned and a second optical system for scanning of a second surface-to-be-scanned, the first optical system and the second optical system being disposed to face each other with the deflector located therebetween; a first optical system detection sensor configured to detect a writing start position on the first surface-to-be-scanned for the first optical system; a second optical system detection sensor configured to detect a writing start position on the second surface-to-be-scanned for the second optical system; a first optical system reflection mirror configured to guide a luminous flux from the first optical system to the first optical system detection sensor; a second optical system reflection mirror configured to guide a luminous flux from the second optical system to the second optical system detection sensor; and a housing in which the deflector, the first optical system, the second optical system, the first optical system reflection mirror, and the second optical system reflection mirror are housed.

In a cross-sectional view in a sub-scanning direction, the housing has a structure divided into an upper stage and a lower stage by a mounting plate on which the deflector, the first optical system and the second optical system are mounted. The deflector is mounted in one of the upper stage and the lower stage. The first optical system reflection mirror and the second optical system reflection mirror are mounted in the other of the upper stage and the lower stage in which the deflector is not mounted. Each of the first optical system and the second optical system is disposed across a region including the upper stage and the lower stage. The first optical system reflection mirror and the second optical system reflection mirror are disposed with the deflector located therebetween. The first optical system reflection mirror is disposed on a side of the second optical system, and the second optical system reflection mirror is disposed on a side of the first optical system.

This image forming apparatus is provided as an image forming apparatus including: an image carrier having a main scanning direction; and the optical scanning device described in any of the above, the optical scanning device including a deflector that is configured to cause a light beam to scan a surface of the image carrier.

BRIEF DESCRIPTION OF THE DRAWINGS

The advantages and features provided by one or more embodiments of the disclosure will become more fully understood from the detailed description given hereinbelow and the appended drawings which are given by way of illustration only, and thus are not intended as a definition of the limits of the present disclosure.

DETAILED DESCRIPTION OF EMBODIMENTS

Hereinafter, one or more embodiments of the present disclosure will be described with reference to the drawings. However, the scope of the disclosure is not limited to the disclosed embodiments.

An optical scanning device and an image forming apparatus in an embodiment according to the present disclosure will be hereinafter described with reference to the accompanying drawings. In the embodiments described below, when the number, the quantity and the like are mentioned, the scope of the present disclosure is not necessarily limited thereto unless otherwise specified. The same or corresponding components are designated by the same reference characters, and the description thereof may not be repeated. The luminous flux shown in each of the figures described below show a main beam of light emitted from each light source.

First Embodiment: Image Forming Apparatus 1

Figure 1:
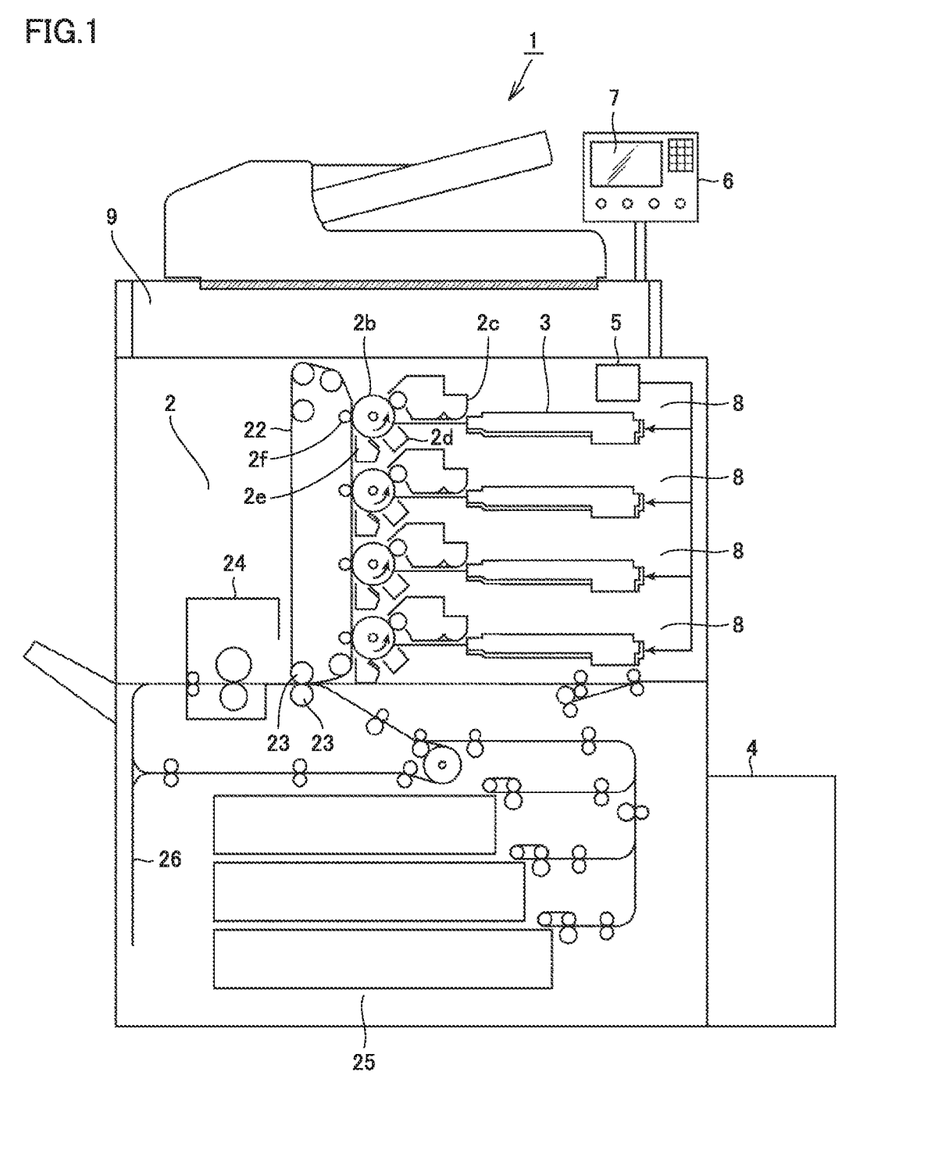
FIG. 1 is a diagram showing an example of the internal structure of an image forming apparatus according to the first embodiment.

Referring to FIG. 1, an image forming apparatus 1 will be described. FIG. 1 is a diagram showing an example of the internal structure of image forming apparatus 1.

FIG. 1 shows image forming apparatus 1 as a color printer. In the following, image forming apparatus 1 will be described as a color printer, but image forming apparatus 1 is not limited to a color printer. For example, image forming apparatus 1 may be a monochrome printer, or may be a facsimile machine, or may be a multi-functional peripheral (MFP) including a monochrome printer, a color printer and a facsimile machine.

Image forming apparatus 1 includes an image forming unit 2 as shown in FIG. 1, and is configured to form an image on a sheet of paper by image forming unit 2 based on original image data in bit map format. Image forming apparatus 1 includes: an image reading unit 9 configured to read a document and generate original image data; an image generation unit 4 configured to generate original image data in response to an instruction from outside to form an image; an image processing unit 5 configured to subject the generated original image data to image processing; and an operation unit 6 and a display unit 7 each as a user interface.

Image forming unit 2 forms an image including a plurality of colors on a sheet of paper based on the original image data that has been subjected to image processing by image processing unit 5. Image forming unit 2 includes four writing units 8, an intermediate transfer belt 22, a secondary transfer roller 23, a fixing device 24, a paper feed tray 25, and a reverse path 26, as shown in FIG. 1.

Writing units 8 are arranged in series (in tandem) along the belt surface of intermediate transfer belt 22. Intermediate transfer belt 22 serves as an image carrier that is wound around a plurality of rollers so as to rotate. The plurality of rollers include a primary transfer roller 2f and a secondary transfer roller 23. Secondary transfer roller 23 and fixing device 24 are disposed on a conveyance path on which a sheet of paper is conveyed from paper feed tray 25.

Four writing units 8 serve to form four images of their respective colors including cyan (C), magenta (M), yellow (Y), and black (K). These writing units 8 have the same configuration including an optical scanning device 3, a photoreceptor 2b as an image carrier, a developing unit 2c, a charging unit 2d, a cleaning unit 2e, and a primary transfer roller 2f, as shown in FIG. 1.

During image formation, in each of writing units 8, photoreceptor 2b is charged by application of a voltage from charging unit 2d. Then, by optical scanning device 3, photoreceptor 2b is scanned by a luminous flux emitted based on the original image data, thereby forming an electrostatic latent image. A color material such as a toner is supplied by developing unit 2c to develop the electrostatic latent image on photoreceptor 2b, thereby forming an image on photoreceptor 2b.

When the images in four colors are formed on their respective photoreceptors 2b of writing units 8, the images are sequentially transferred by their respective primary transfer rollers 2f onto intermediate transfer belt 22 (primary transfer) so as to be superimposed on one another, thereby forming an image in a plurality of colors. After primary transfer, in each writing unit 8, the color material remaining on photoreceptor 2b is removed by cleaning unit 2e.

Then, a sheet of paper is fed from paper feed tray 25, and the image on intermediate transfer belt 22 is transferred onto the sheet of paper by secondary transfer roller 23. The sheet of paper having the image transferred thereonto is heated and pressurized by fixing device 24, thereby fixing the image to the sheet of paper.

In the case where an image is formed on both sides of one sheet of paper, the sheet of paper is conveyed to reverse path 26, in which the sheet of paper is flipped over. Then, the sheet of paper is again conveyed to secondary transfer roller 23.

Image reading unit 9 reads the document that is set by a user, and generates original image data in bit map format for each of colors including red (R), green (G) and blue (B).

Image generation unit 4 receives data including image formation instruction details described in a page description language (PDL) from external devices such as a user terminal and a server over a network, and subjects the received data to rasterizing, thereby generating original image data in bit map format in each of colors of C, M, Y, and K.

Image processing unit 5 performs color conversion of the original image data in each of colors of R, G and B that has been generated by image reading unit 9, and then outputs the original image data in each of colors of C, M, Y, and K. By image processing unit 5, the original image data having been subjected to color conversion or the original image data generated by image generation unit 4 is subjected to image processing such as tone correction processing and halftone processing. The tone correction processing is performed for converting the color tone value of each pixel in the original image data into a color tone value that is corrected such that the concentration of the image formed on the sheet of paper becomes equal to a target concentration. The halftone processing is, for example, error diffusion processing, screen processing using a systematic dithering method, and the like.

(Optical Scanning Device 3)

Figure 2:
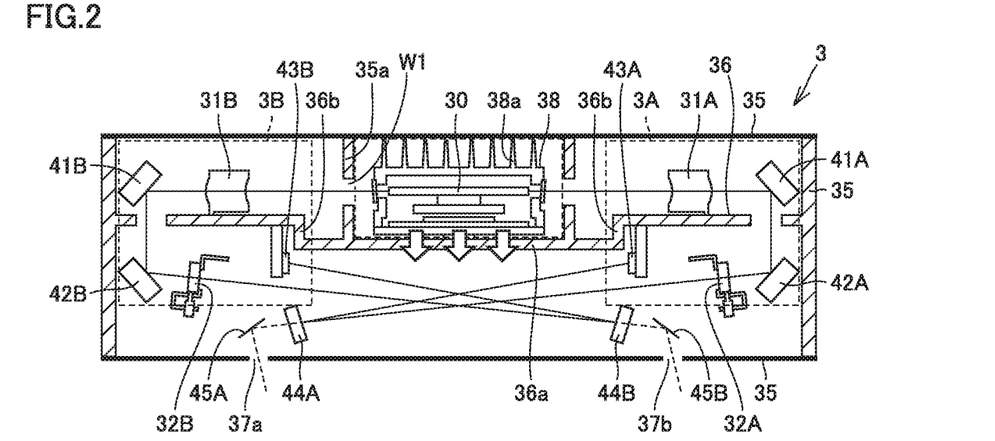
FIG. 2 is a cross-sectional view showing the internal structure of an optical scanning device in a sub-scanning direction according to the first embodiment.
Figure 3:
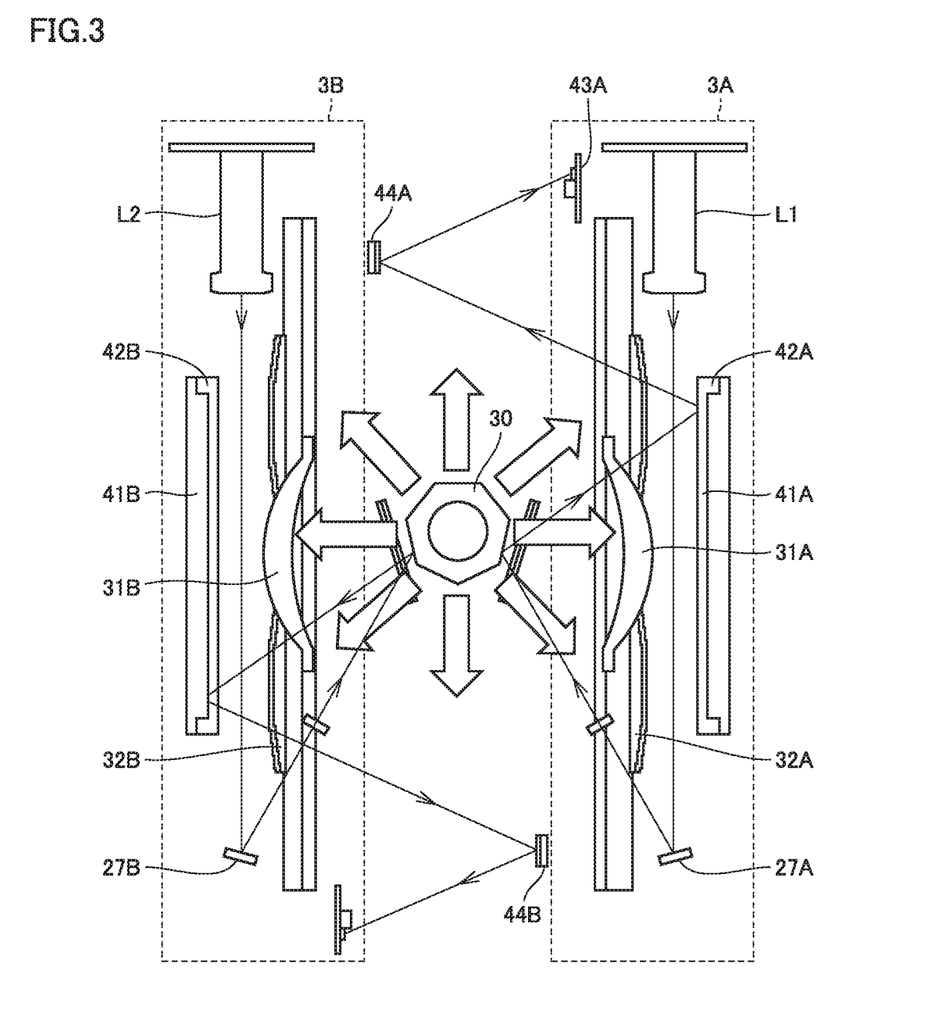
FIG. 3 is a cross-sectional view showing the internal structure of the optical scanning device in a main scanning direction according to the first embodiment.

Then, the internal configuration of optical scanning device 3 will be hereinafter described with reference to FIGS. 2 and 3. FIG. 2 is a cross-sectional view showing the internal structure of optical scanning device 3 in the sub-scanning direction. FIG. 3 is a cross-sectional view showing the internal structure of optical scanning device 3 in the main scanning direction. The main scanning direction corresponds to the direction in which the rotation axis of photoreceptor 2b extends. The sub-scanning direction corresponds to the direction orthogonal to the main scanning direction.

Optical scanning device 3 has a housing 35. On the inside of housing 35, a deflector 30 configured to deflect the luminous fluxes from a first light source L1 and a second light source L2 is provided. The luminous flux emitted from first light source L1 is reflected by a first mirror 27A and directed to deflector 30. The luminous flux emitted from second light source L2 is reflected by a second mirror 27B and directed to deflector 30. Deflector 30 is covered by a heat dissipation member 38 provided with a heat dissipation fin 38a.

On the inside of housing 35, a first optical system 3A and a second optical system 3B for scanning of their respective surfaces-to-be-scanned are disposed to face each other with deflector 30 located therebetween. First optical system 3A includes a first lens 31A of the first optical system, a first turning mirror 41A of the first optical system, a second turning mirror 42A of the first optical system, a first optical system last lens 32A, and a first optical system reflection mirror 44A. Second optical system 3B includes a first lens 31B of the second optical system, a first turning mirror 41B of the second optical system, a second turning mirror 42B of the second optical system, a second optical system last lens 32B, and a second optical system reflection mirror 44B. Each of the turning mirrors reflects a luminous flux and bends an optical path in a prescribed direction.

Housing 35 has a structure divided into an upper stage and a lower stage by a mounting plate 36 on which components of deflector 30, first optical system 3A and second optical system 3B are mounted. In the present embodiment, deflector 30 is disposed on the upper surface side of mounting plate 36. First lens 31A of the first optical system and first turning mirror 41A of the first optical system in first optical system 3A are also disposed on the upper surface side of mounting plate 36. First lens 31B of the second optical system and first turning mirror 41B of the second optical system in second optical system 3B are also disposed on the upper surface side of mounting plate 36.

Second turning mirror 42A of the first optical system and first optical system last lens 32A in first optical system 3A are disposed on the lower surface side of mounting plate 36. Second turning mirror 42B of the second optical system and second optical system last lens 32B in second optical system 3B are also disposed on the lower surface side of mounting plate 36.

Mounting plate 36 includes a stepped portion 36b between deflector 30 and first optical system 3A, and also between deflector 30 and second optical system 3B. Each stepped portion 36b is provided to cause a difference in height of mounting plate 36 in a cross-sectional view in the sub-scanning direction. This stepped portion 36b is provided so as to cause a difference in height of mounting plate 36 such that, in the lower stage in which deflector 30 is not mounted, each of a space including first optical system 3A and a space including second optical system 3B is relatively large. Thereby, on the lower surface side of mounting plate 36, each of the space including first optical system 3A and the space including second optical system 3B is larger than the space below deflector 30.

On the second optical system 3B side, first optical system reflection mirror 44A that reflects the luminous flux reflected back by second turning mirror 42A of the first optical system is provided in the vicinity of stepped portion 36b. Similarly, on the first optical system 3A side, second optical system reflection mirror 44B that reflects the luminous flux reflected back by second turning mirror 42B of the second optical system is provided in the vicinity of stepped portion 36b.

In first optical system 3A, a first optical system detection sensor 43A for detecting the writing start position on the surface-to-be-scanned for first optical system 3A is provided in the vicinity of stepped portion 36b. Similarly, in second optical system 3B, a second optical system detection sensor 43B for detecting the writing start position on the surface-to-be-scanned for second optical system 3B is provided in the vicinity of stepped portion 36b.

First optical system reflection mirror 44A guides the luminous flux from first optical system 3A to first optical system detection sensor 43A. Second optical system reflection mirror 44B guides the luminous flux from second optical system 3B to second optical system detection sensor 43B.

In first optical system reflection mirror 44A, the incident light flux is divided into a luminous flux guided to first optical system detection sensor 43A and a luminous flux guided by a reflection mirror 45A to pass through a slit 37a provided in housing 35 so as to be emitted toward photoreceptor 2b. Similarly, in second optical system reflection mirror 44B, the incident light flux is divided into a luminous flux guided to second optical system detection sensor 43B and a luminous flux guided by a reflection mirror 45B to pass through a slit 37b provided in housing 35 so as to be emitted toward photoreceptor 2b.

As described above, according to the configuration of optical scanning device 3 in the present embodiment, first optical system reflection mirror 44A and second optical system reflection mirror 44B are disposed to face each other with deflector 30 located therebetween, and are also located in the vicinities of each other's optical systems. This allows formation of a space in a region below mounting plate 36 that receives a thermal effect (indicated by outlined arrows in FIG. 2) from deflector 30. Accordingly, various components receiving a thermal effect from deflector 30 can be disposed at the positions spaced apart from deflector 30, so that the posture change of a reflection mirror and the like caused by heat from deflector 30 can be suppressed. As a result, image deterioration (color deviation) in the image forming apparatus can be suppressed.

Furthermore, the luminous flux from first optical system 3A is guided by first optical system reflection mirror 44A to first optical system detection sensor 43A while the luminous flux from second optical system 3B is guided by second optical system reflection mirror 44B to second optical system detection sensor 43B. By such a configuration, the optical path can be increased in length while avoiding a thermal effect from deflector 30. Thus, the space inside housing 35 is efficiently utilized without having to use a plurality of reflection mirrors, with the result that the apparatus can be reduced in size at low cost.

Furthermore, first optical system reflection mirror 44A is disposed behind first optical system last lens 32A while second optical system reflection mirror 44B is disposed behind second optical system last lens 32B. Thereby, the luminous flux guided to an optical detection sensor and the luminous flux that scans a surface-to-be-scanned can be rendered optically equivalent to each other (the luminous fluxes having passed through the same optical lens). Accordingly, it becomes possible to suppress relative deviation between the luminous flux on the optical detection sensor and the luminous flux at the scanning start position on the surface-to-be-scanned, which results from the posture change and the optical performance change of the optical element that are caused by heat.

Furthermore, in first optical system 3A, a light collecting lens is not used for first optical system detection sensors 43A, but one first optical system reflection mirror 44A for guiding a luminous flux to first optical system detection sensor 43A is provided, so as to minimize the posture change and the performance change of the optical element caused by heat (allowing only the posture change of one first optical system reflection mirror 44A). Thereby, the positional displacement of the luminous flux incident upon first optical system detection sensor 43A can be suppressed at low cost. The same also applies to second optical system 3B.

Referring to FIGS. 4 to 8, further functions and effects of the configuration in the present embodiment will be hereinafter described. FIG. 4 to FIG. 7 are the first to sixth cross-sectional views each showing the internal structure of optical scanning device 3 in the sub-scanning direction for illustrating further functions and effects of the present embodiment.

Figure 4:
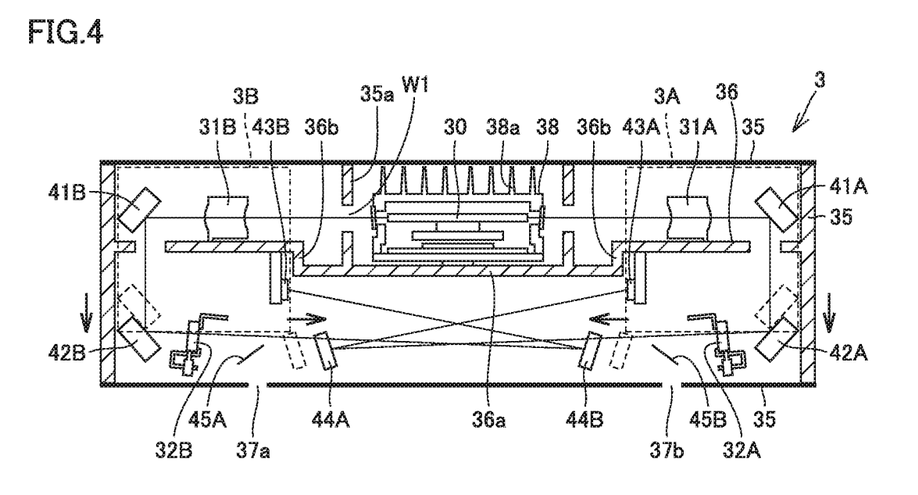
FIGS. 4 to 8 are the first to fifth cross-sectional views each showing the internal structure of the optical scanning device in the sub-scanning direction for illustrating further functions and effects of the first embodiment.

Referring to FIG. 4, for example, in first optical system 3A, first turning mirror 41A of the first optical system and second turning mirror 42A of the first optical system are provided, so that the optical path length between the turning mirrors can be changed as indicated by a dashed line in the figure. As a result, the installation positions of first optical system reflection mirror 44A and first optical system detection sensor 43A can be readily adjusted. The same also applies to second optical system 3B. As a result, the design flexibility of optical scanning device 3 can be increased while the apparatus can be reduced in size.

Figure 5:
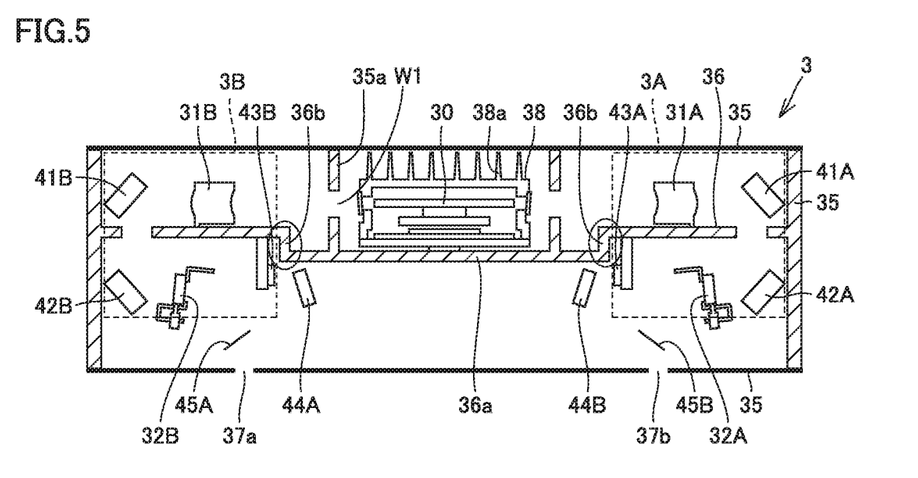
Figure 6:
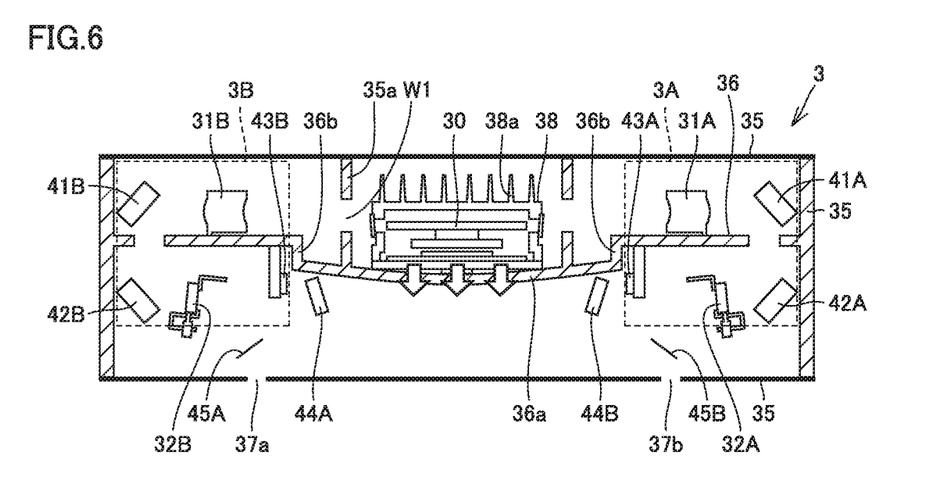

Referring to FIGS. 5 and 6, stepped portion 36b is provided between deflector 30 and first optical system 3A and also between deflector 30 and second optical system 3B. Thereby, even when the surface on which deflector 30, first optical system 3A and second optical system 3B are mounted is distorted due to a thermal effect from deflector 30, stepped portion 36b having high strength serves as a joint, so that distortion (distortion in the direction indicated by outlined arrows in FIG. 6) can be reduced.

By employing the above-described configuration, first optical system reflection mirror 44A, second optical system reflection mirror 44B, first optical system detection sensor 43A, and second optical system detection sensor 43B are disposed in the vicinity of stepped portion 36b with reduced distortion, so that the posture change of each component caused by heat distortion of the attachment surface of each component can be suppressed. As a result, image deterioration (color deviation) in the image forming apparatus can be suppressed.

Figure 7:
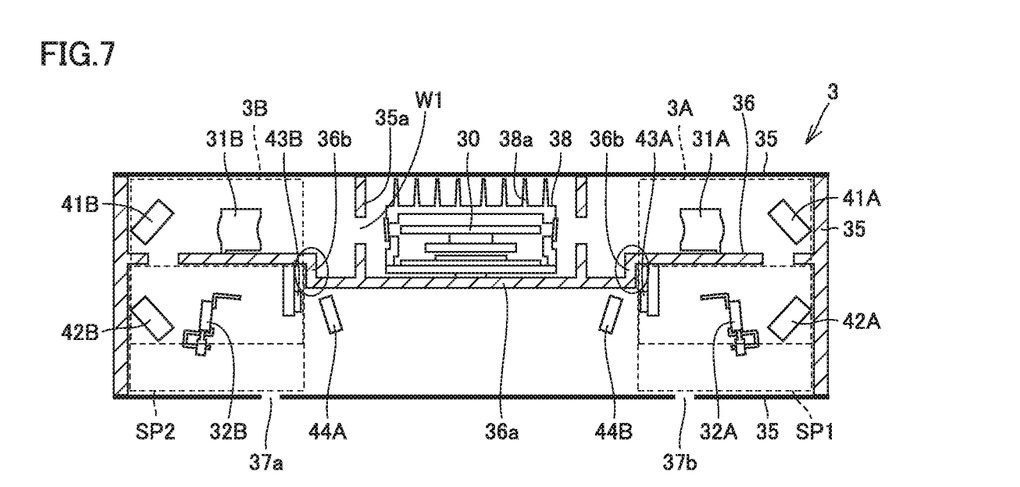

Furthermore, as shown in FIG. 7, preferably, by providing stepped portion 36b, the region in the lower stage of each of first optical system 3A and second optical system 3B (each region surrounded by a dashed line) can be widely ensured. As a result, an optical component can be disposed in this region, thereby allowing contribution to downsizing of optical scanning device 3.

Figure 8:
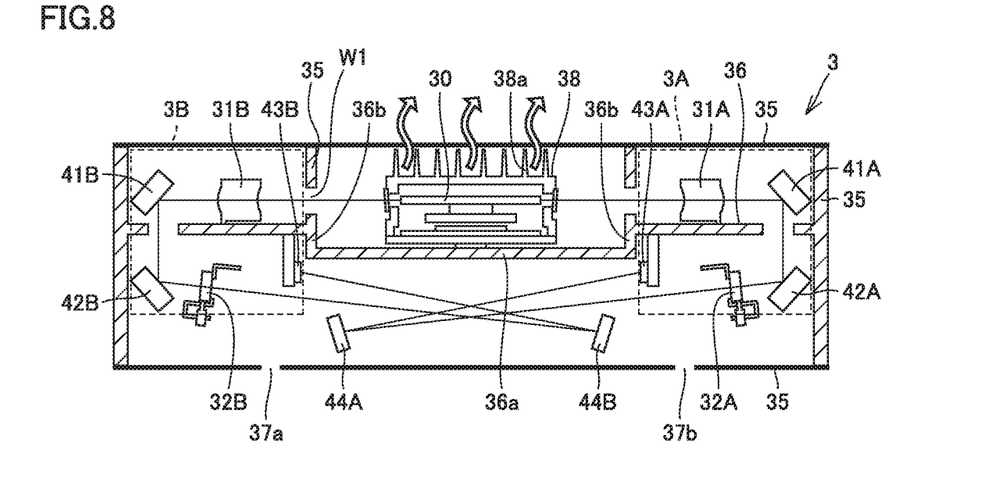

Furthermore, as shown in FIG. 8, deflector 30 is preferably disposed in the upper stage of housing 35. Thereby, the heat from deflector 30 accumulates in the upper area, so that the posture change of each optical component disposed in the lower stage of housing 35 that is caused by the influence of heat can be suppressed. As a result, image deterioration (color deviation) in the image forming apparatus can be suppressed.

Second Embodiment

Figure 9:
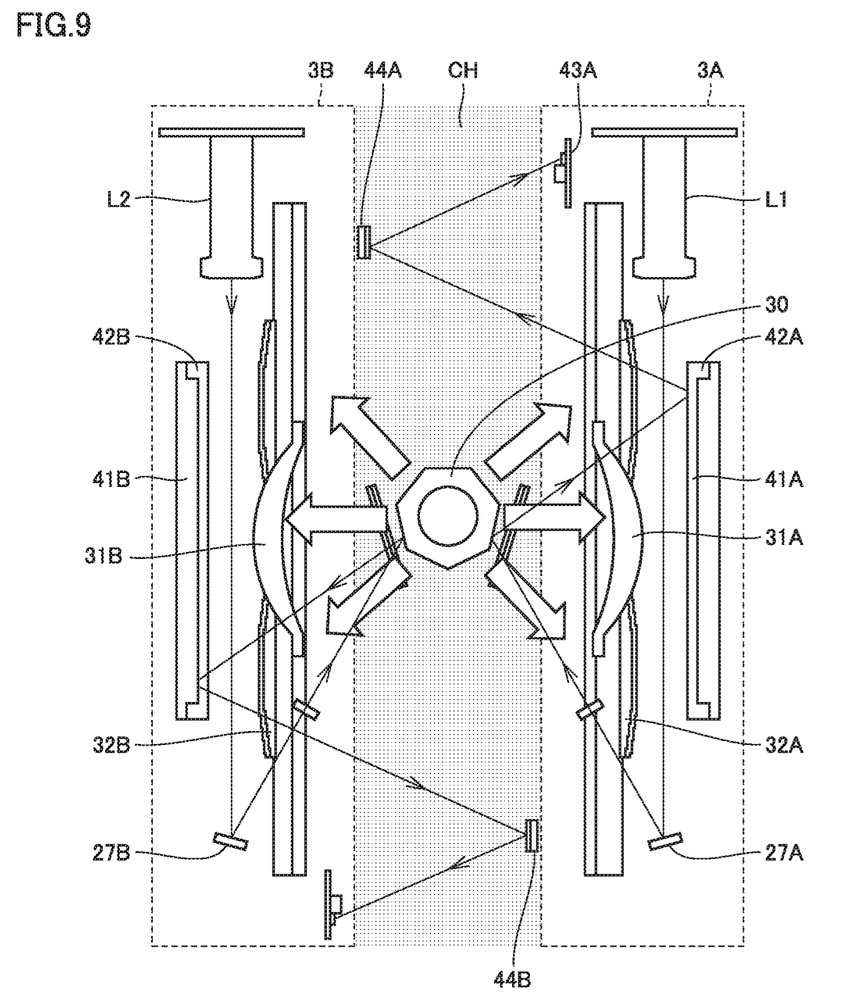
FIG. 9 is a cross-sectional view showing the internal structure of an optical scanning device in a main scanning direction according to the second embodiment.
Figure 10:
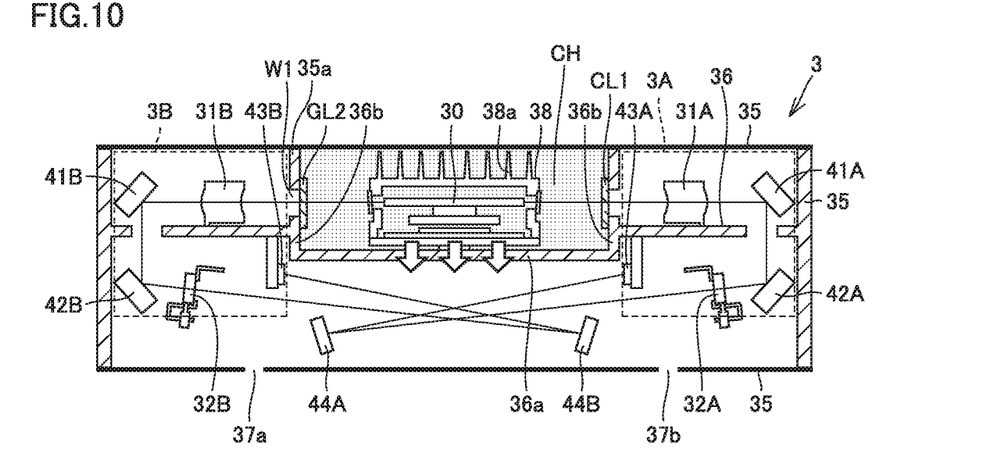
FIGS. 10 and 11 are the first and second cross-sectional views each showing the internal structure of an optical scanning device 3 in a sub-scanning direction according to the second embodiment.
Figure 11:
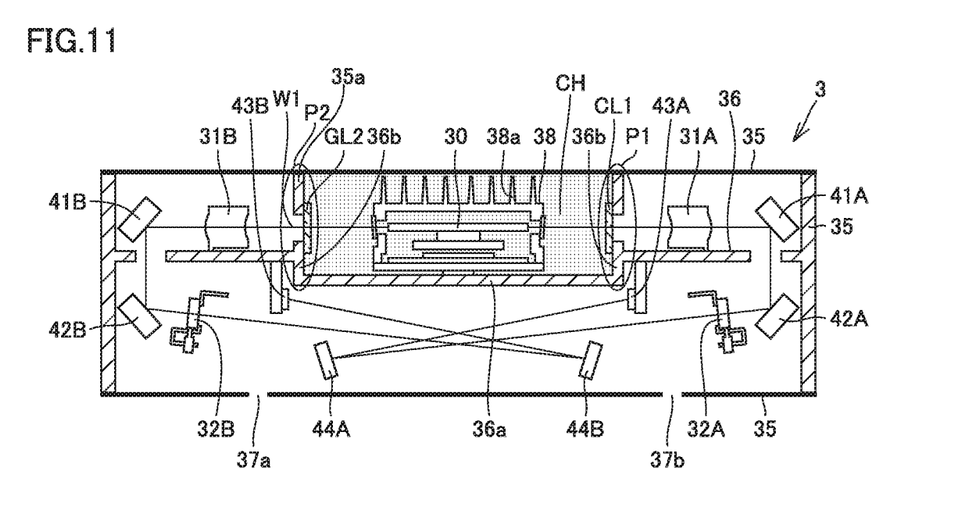

Referring to FIGS. 9 to 11, the configuration of optical scanning device 3 in the second embodiment will be hereinafter described. FIG. 9 is a cross-sectional view showing the internal structure of optical scanning device 3 in the main scanning direction. FIGS. 10 and 11 are the first and second cross-sectional views each showing the internal structure of optical scanning device 3 in the sub-scanning direction.

Referring to FIGS. 10 and 11, optical scanning device 3 in the present embodiment is provided with a coolant flow path CH formed to include deflector 30 and pass through housing 35. The coolant introduced into coolant flow path CH may be any coolant as long as it does not affect the performance of deflector 30, but may generally be air as a conceivable coolant.

In the configuration of the present embodiment, stepped portion 36*b* forms a part of a sidewall 35*a* of coolant flow path CH. Sidewall 35*a* is provided with a slit W1 through which a luminous flux passes. To this slit W1, a glass GL1 as a transparent member is attached, thereby enhancing the airtightness of coolant flow path CH, so that leakage of the coolant from coolant flow path CH is prevented.

In this way, coolant flow path CH is provided to allow dissipation of the heat generated from deflector 30. Thereby, it becomes possible to suppress the posture change of each optical component, which is disposed inside housing 35 of optical scanning device 3, caused by the thermal effect from deflector 30. As a result, image deterioration (color deviation) in the image forming apparatus can be suppressed.

In each of the regions surrounded by lines designated as P1 and P2 shown in FIG. 11, stepped portion 36*b* forms a part of sidewall 35*a* of coolant flow path CH, thereby allowing contribution to downsizing of optical scanning device 3.

As described above, according to the optical scanning device and the image forming apparatus in the present embodiment, in an optical scanning device using a bilateral deflection-type optical system (a bilateral deflection system) including the first optical system and the second optical system that are disposed to face each other with a common deflector located therebetween, a detection sensor for detecting an optical scanning start position is mounted for each of the first optical system and the second optical system, a housing accommodating a deflector and an optical element of each of the optical systems is structured to have an upper stage and a lower stage, the deflector is mounted in one of the upper stage and lower stage, and each optical element is disposed across a region including the upper stage and the lower stage.

Furthermore, without using a light collecting lens for an optical detection sensor, one reflection mirror for an optical detection sensor is placed behind a last lens in each of the scanning optical systems. These mirrors are located in the vicinities of each other's scanning optical systems with the deflector located these mirrors.

By the configuration as described above, the optical scanning device can be reduced in size at low cost while suppressing image deterioration in the image forming apparatus.

The above-described optical scanning device includes: a deflector configured to deflect a luminous flux from a light source; a first optical system for scanning of a first surface-to-be-scanned and a second optical system for scanning of a second surface-to-be-scanned, the first optical system and the second optical system being disposed to face each other with the deflector located therebetween; a first optical system detection sensor configured to detect a writing start position on the first surface-to-be-scanned for the first optical system; a second optical system detection sensor configured to detect a writing start position on the second surface-to-be-scanned for the second optical system; a first optical system reflection mirror configured to guide a luminous flux from the first optical system to the first optical system detection sensor; a second optical system reflection mirror configured to guide a luminous flux from the second optical system to the second optical system detection sensor; and a housing in which the deflector, the first optical system, the second optical system, the first optical system reflection mirror, and the second optical system reflection mirror are housed.

In a cross-sectional view in a sub-scanning direction, the housing has a structure divided into an upper stage and a lower stage by a mounting plate on which the deflector, the first optical system and the second optical system are mounted. The deflector is mounted in one of the upper stage and the lower stage. Each of the first optical system reflection mirror and the second optical system reflection mirror is mounted in the other of the upper stage and the lower stage in which the deflector is not mounted. Each of the first optical system and the second optical system is disposed across a region including the upper stage and the lower stage. The first optical system reflection mirror and the second optical system reflection mirror are disposed with the deflector located therebetween. The first optical system reflection mirror is disposed on a side of the second optical system, and the second optical system reflection mirror is disposed on a side of the first optical system.

In another embodiment, the first optical system reflection mirror is disposed behind a last lens included in the first optical system, and the second optical system reflection mirror is disposed behind a last lens included in the second optical system.

In another embodiment, an optical path of the luminous flux guided to the first optical system detection sensor is optically equivalent to an optical path of a luminous flux that scans the first surface-to-be-scanned, and an optical path of the luminous flux guided to the second optical system detection sensor is optically equivalent to an optical path of a luminous flux that scans the second surface-to-be-scanned.

In another embodiment, the first optical system includes two first optical system turning mirrors each configured to reflect a luminous flux and bend an optical path, and the second optical system includes two second optical system turning mirrors each configured to reflect a luminous flux and bend an optical path.

In another embodiment, the mounting plate includes a stepped portion between the deflector and the first optical system, and between the deflector and the second optical system, the stepped portion causing a difference in height of the mounting plate in the cross-sectional view in the sub-scanning direction, at least one of the first optical system detection sensor and the first optical system reflection mirror is disposed in a vicinity of the stepped portion, and at least one of the second optical system detection sensor and the second optical system reflection mirror is disposed in a vicinity of the stepped portion.

In another embodiment, in the cross-sectional view in the sub-scanning direction, the stepped portion is provided so as to cause a difference in height of the mounting plate such that, in the upper stage or the lower stage in which the deflector is not mounted, each of a space including the first optical system and a space including the second optical system is relatively large.

In another embodiment, the upper stage or the lower stage of the housing in which the deflector is mounted includes a coolant flow path through which a coolant for cooling the deflector flows, the coolant flow path being formed to include the deflector and pass through the housing in a main scanning direction.

In another embodiment, the first optical system reflection mirror and the second optical system reflection mirror are disposed on an opposite side of the mounting plate from the coolant flow path.

In another embodiment, the first optical system detection sensor and the second optical system detection sensor are provided in a vicinity of the coolant flow path.

In another embodiment, the stepped portion forms a part of a side surface of the coolant flow path.

In another embodiment, the deflector is disposed in the upper stage of the housing.

The above-described image forming apparatus is an image forming apparatus including: an image carrier having a main scanning direction; and the optical scanning device described in any of the above, the optical scanning device including a deflector that is configured to cause a light beam to scan a surface of the image carrier.

Although embodiments of the present disclosure have been described and illustrated in detail, the disclosed embodiments are made for purposes of illustration and example only and not limitation. The scope of the present disclosure should be interpreted by terms of the appended claims.

What is claimed is:

1. An optical scanning device comprising:
    a deflector configured to deflect a luminous flux from a light source;
    a first optical system for scanning of a first surface-to-be-scanned and a second optical system for scanning of a second surface-to-be-scanned, the first optical system and the second optical system being disposed to face each other with the deflector located therebetween;
    a first optical system detection sensor configured to detect a writing start position on the first surface-to-be-scanned for the first optical system;
    a second optical system detection sensor configured to detect a writing start position on the second surface-to-be-scanned for the second optical system;
    a first optical system reflection mirror configured to guide a luminous flux from the first optical system to the first optical system detection sensor;
    a second optical system reflection mirror configured to guide a luminous flux from the second optical system to the second optical system detection sensor; and
    a housing in which the deflector, the first optical system, the second optical system, the first optical system reflection mirror, and the second optical system reflection mirror are housed, wherein
    in a cross-sectional view in a sub-scanning direction, the housing has a structure divided into an upper stage and a lower stage by a mounting plate on which the deflector, the first optical system and the second optical system are mounted,
    the deflector is mounted in one of the upper stage and the lower stage,
    each of the first optical system reflection mirror and the second optical system reflection mirror is mounted in the other of the upper stage and the lower stage in which the deflector is not mounted,
    each of the first optical system and the second optical system is disposed across a region including the upper stage and the lower stage,
    the first optical system reflection mirror and the second optical system reflection mirror are disposed with the deflector located therebetween, and
    the first optical system reflection mirror is disposed on a side of the second optical system, and the second optical system reflection mirror is disposed on a side of the first optical system.

2. The optical scanning device according to claim 1, wherein
    the first optical system reflection mirror is disposed behind a last lens included in the first optical system, and
    the second optical system reflection mirror is disposed behind a last lens included in the second optical system.

3. The optical scanning device according to claim 1, wherein
    an optical path of the luminous flux guided to the first optical system detection sensor is optically equivalent to an optical path of a luminous flux that scans the first surface-to-be-scanned, and
    an optical path of the luminous flux guided to the second optical system detection sensor is optically equivalent to an optical path of a luminous flux that scans the second surface-to-be-scanned.

4. The optical scanning device according to claim 1, wherein
    the first optical system includes two first optical system turning mirrors each configured to reflect a luminous flux and bend an optical path, and
    the second optical system includes two second optical system turning mirrors each configured to reflect a luminous flux and bend an optical path.

5. The optical scanning device according to claim 1, wherein
    the mounting plate includes a stepped portion between the deflector and the first optical system, and between the deflector and the second optical system, the stepped portion causing a difference in height of the mounting plate in the cross-sectional view in the sub-scanning direction,
    at least one of the first optical system detection sensor and the first optical system reflection mirror is disposed in a vicinity of the stepped portion, and
    at least one of the second optical system detection sensor and the second optical system reflection mirror is disposed in a vicinity of the stepped portion.

6. The optical scanning device according to claim 5, wherein
    in the cross-sectional view in the sub-scanning direction, the stepped portion is provided so as to cause a difference in height of the mounting plate such that, in the upper stage or the lower stage in which the deflector is not mounted, each of a space including the first optical system and a space including the second optical system is relatively large.

7. The optical scanning device according to claim 6, wherein the upper stage or the lower stage of the housing in which the deflector is mounted includes a coolant flow path through which a coolant for cooling the deflector flows, the coolant flow path being formed to include the deflector and pass through the housing in a main scanning direction.

8. The optical scanning device according to claim 7, wherein the first optical system reflection mirror and the second optical system reflection mirror are disposed on an opposite side of the mounting plate from the coolant flow path.

9. The optical scanning device according to claim 7, wherein the first optical system detection sensor and the second optical system detection sensor are provided in a vicinity of the coolant flow path.

10. The optical scanning device according to claim 7, wherein the stepped portion forms a part of a side surface of the coolant flow path.

11. The optical scanning device according to claim 1, wherein the deflector is disposed in the upper stage of the housing.

12. An image forming apparatus comprising:
an image carrier having a main scanning direction; and
the optical scanning device according to claim 1, the optical scanning device including a deflector that is configured to cause a light beam to scan a surface of the image carrier.

* * * * *